(12) United States Patent
Gretz (10) Patent No.: US 9,435,353 B1
(45) Date of Patent: Sep. 6, 2016

(54) HANGER AND FAN BOX ASSEMBLY FOR RAIN TIGHT MOUNTING OF A FAN BOX

(71) Applicant: Arlington Industries, Inc., Scranton, PA (US)

(72) Inventor: Thomas J. Gretz, Delray Beach, FL (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 15/070,576

(22) Filed: Mar. 15, 2016

Related U.S. Application Data (63) Continuation-in-part of application No. 14/789,069, filed on Jul. 1, 2015.

(60) Provisional application No. 62/213,234, filed on Sep. 2, 2015.

(51) Int. Cl.
| | | |
|---|---|---|
| *H02G 3/08* | (2006.01) | |
| *F04D 29/64* | (2006.01) | |
| *F04D 25/08* | (2006.01) | |
| *F04D 25/06* | (2006.01) | |

(52) U.S. Cl.
CPC ......... *F04D 29/646* (2013.01); *F04D 25/0693* (2013.01); *F04D 25/088* (2013.01); *H02G 3/08* (2013.01)

(58) Field of Classification Search
CPC ........ H02G 3/088; H02G 3/081; H02G 3/08; H02G 7/00; H02G 3/10; H02G 3/123; H02G 3/125; H02G 3/20; F04D 25/088; F04D 26/646; F04D 25/0693; F04D 29/646
USPC .............. 174/480, 481, 50, 53, 57, 58; 220/3.2–3.9, 4.02; 248/906, 343, 200, 248/200.1
See application file for complete search history.

(56) References Cited

U.S. PATENT DOCUMENTS

| | | | | | |
|---|---|---|---|---|---|
| 3,518,421 | A * | 6/1970 | Cogdill | ................ | F21V 21/02 248/57 |
| 5,044,582 | A * | 9/1991 | Walters | ................ | H02G 3/126 248/343 |
| 5,938,157 | A * | 8/1999 | Reiker | ................ | H02G 3/081 248/906 |
| 5,954,304 | A * | 9/1999 | Jorgensen | ............ | H02G 3/125 248/906 |
| 6,889,943 | B2 * | 5/2005 | Dinh | .................... | F04D 25/088 248/906 |
| 6,967,284 | B1 * | 11/2005 | Gretz | .................... | H02G 3/125 174/50 |
| 7,148,420 | B1 * | 12/2006 | Johnson | ................ | H02G 3/125 174/50 |
| 7,216,838 | B1 * | 5/2007 | Gretz | ................ | E04G 21/1841 248/906 |
| 7,271,350 | B2 * | 9/2007 | Johnson | ................ | H02G 3/20 174/480 |
| 7,355,118 | B1 * | 4/2008 | Gretz | ................ | H02G 3/125 174/50 |
| 7,381,893 | B2 * | 6/2008 | Kerr, Jr. | ............... | H02G 3/125 174/50 |
| 8,714,506 | B2 * | 5/2014 | Korcz | ................ | H02G 3/20 248/343 |

* cited by examiner

*Primary Examiner* — Angel R Estrada (57) ABSTRACT

A hanger assembly and electrical box combination for enabling rain-tight mounting of a light fixture, paddle fan, or similar electrical device from an overhead support structure. The hanger assembly includes sliding tubular members with end flanges for spanning between adjacent overhead joists. A mounting plate, bracket, and fastener combination enables connection of a rain-proof electrical box may to the hanger assembly while locking the tubular members with respect to one another. A medallion connectable to the electrical box in a rain-tight fit includes a wide flange for directing rain and water away from the electrical box assembly. Adjoining planar surfaces on the electrical box and medallion enable a flush, rain-tight fit between the medallion and the electrical box.

12 Claims, 7 Drawing Sheets

HANGER AND FAN BOX ASSEMBLY FOR RAIN TIGHT MOUNTING OF A FAN BOX

CROSS-REFERENCE TO RELATED APPLICATIONS

This application claims priority to provisional U.S. Application No. 62/213,234, filed Mar. 17, 2015, and is a continuation in part of U.S. application Ser. No. 14/789,069, filed Jul. 1, 2015, the entire contents of which applications are incorporated herein by reference.

FIELD OF THE INVENTION

This invention relates to mounting of electrical fans, and specifically to a rain tight fan box assembly for mounting a fan to an overhead support member.

BACKGROUND OF THE INVENTION

Overhead electrical fans or fixtures are often mounted in locations that are exposed to the elements, inside or outside. Many locations are exposed to wind-driven rain and water spray. Typically, the overhead fan or fixture is mounted to a conventional electrical box that is secured to rafters or similar overhead supports.

Unfortunately, conventional electrical boxes used to support a wet-rated or damp-rated fan or fixture do not prevent moisture or water from entering the box, thus leading to an unsafe condition and potentially an electrical short. Open areas in a conventional electrical box can allow water to build up in the electrical box and canopy and thus compromise the safety of the wiring within the box and fixture.

Accordingly, it would be desirable to provide a hanger and fan box assembly that enables mounting a fan or fixture to overhead joists and which also provides a rain tight seal between the overhead support and the fan canopy and thus prevents a penetration of moisture from reaching the wiring within the electrical box and canopy.

BRIEF SUMMARY OF THE INVENTION

The invention is a hanger assembly and electrical box combination for enabling rain-tight mounting of a light fixture, paddle fan, or similar electrical device from an overhead support structure. The hanger assembly includes sliding tubular members with end flanges for spanning between adjacent overhead joists. A mounting plate, bracket, and fastener combination enables connection of a rain-tight electrical box may to the hanger assembly while locking the tubular members with respect to one another. A medallion connectable to the electrical box in a rain-tight fit includes a wide flange for directing rain and water away from the electrical box assembly. Adjoining planar surfaces on the electrical box and medallion enable a flush, rain-tight fit between the medallion and the electrical box.

OBJECTS AND ADVANTAGES

A first object of the invention is to provide a hanger and fan box assembly for providing rain-tight mounting of a fan box or fixture to an overhead support.

A second object of the invention is to provide a hanger and fan box assembly in which the load is supported by the hanger, and not by the fan box itself.

A further object of the current invention is to provide a rain tight electrical box assembly that enables secure and rain-tight mounting of electrical fixtures or fans to a structural member.

Another object of the invention is to provide a labor saving solution to installing a fan or fixture exposed to rain or moisture, either indoors or outdoors.

A further object of the invention is to provide a fan or fixture box that eliminates the need for time-consuming field modifications.

A further object of the invention is to provide a fan or fixture box that is completely sealed so that water stays out and the wiring stays dry.

A further object of the invention is to provide a fan or fixture box that is capable of supporting a 70 pound fan or fixture securely and safely.

A further object of the invention is to provide a fan or fixture box that is adapted for use with electrical cable or conduit.

These and other objects and advantages of the present invention will be better understood by reading the following description along with reference to the drawings.

DETAILED DESCRIPTION

Figure 1:
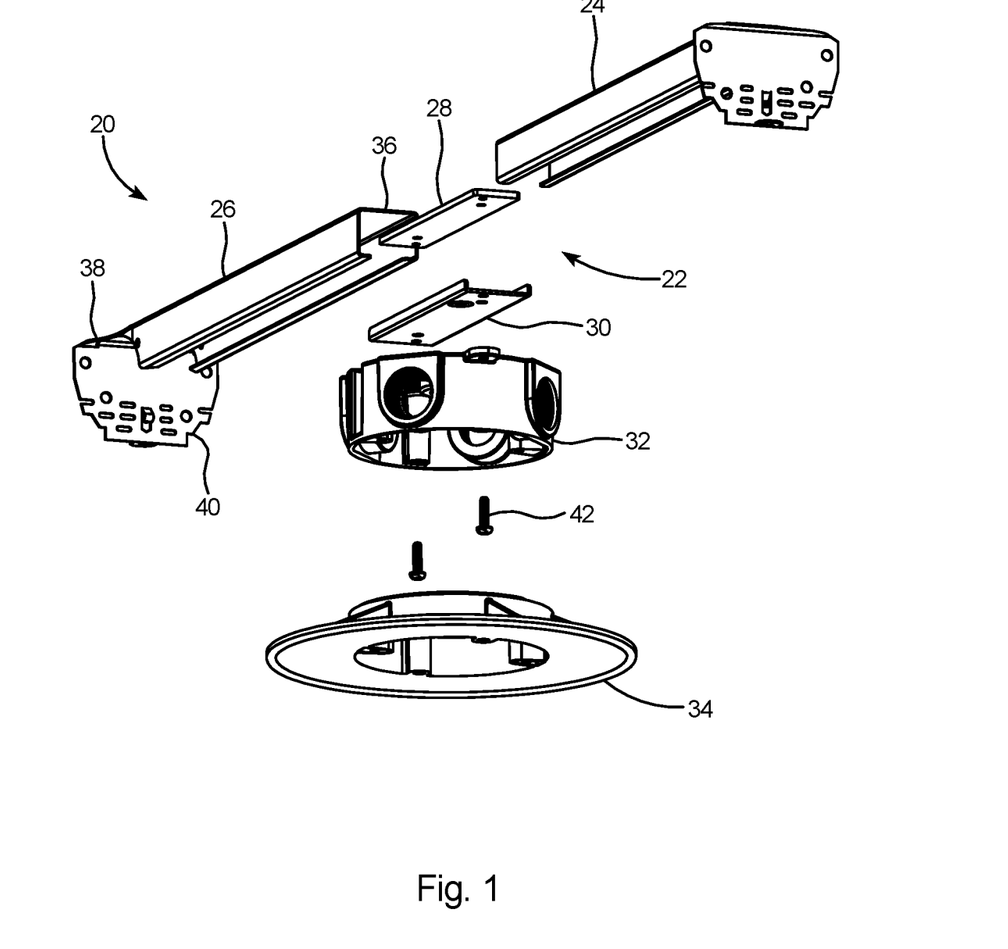
FIG. 1 is an exploded isometric view of the preferred embodiment of a hanger and fan box assembly for rain tight mounting of a fan box according to the present invention.

With reference to FIG. 1 there is shown the preferred embodiment of a hanger and fan box assembly 20 for rain tight mounting of a fan box or fixture. The hanger and fan box assembly 20 includes a hanger assembly 22 including an inner bar 24, an outer bar 26, a mounting plate 28, and a mounting bracket 30. The hanger and fan box assembly 20 further includes a rain-tight electrical box 32 and medallion 34. The inner bar 24 and outer bar 26 include inner ends 36 and outer ends 38 and an end plate 40 integral with each outer end. Mounting plate 28 may be slid within inner bar 24, and inner end 36 of inner bar 24 may be slid within outer bar 26 to form the hanger assembly 22. Box fasteners 42 provide a means of loosely assembling the electrical box 32 to the hanger assembly 22.

Figure 2:
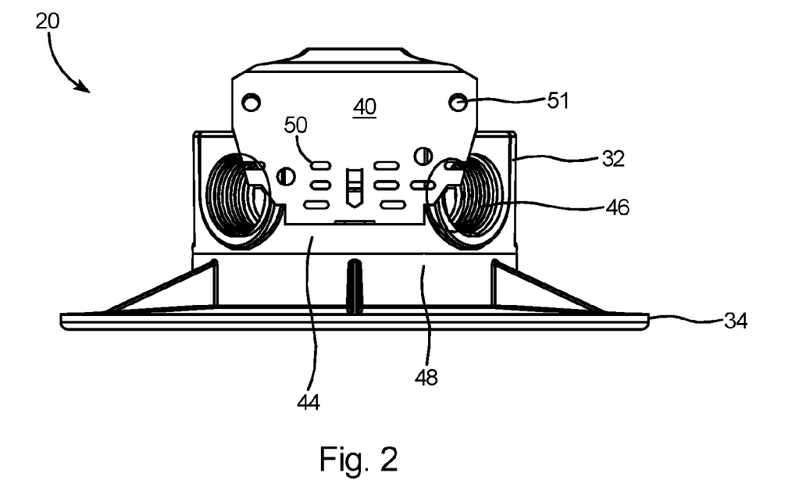
FIG. 2 is a side view of a preferred embodiment of a rain tight fan box which forms a portion of the rain tight fan box and hanger assembly of FIG. 1.

Referring to FIG. 2, the electrical box 32 includes sidewalls 44 and one or more conduit ports 46 within the sidewalls. End plates 40 include a planar bottom edge 48, one or more row of slots 50, and one or more nailing apertures 51 therein. Each row of slots 50 is configured to be parallel with the bottom edge 48 of the end plate 40.

Figure 3:
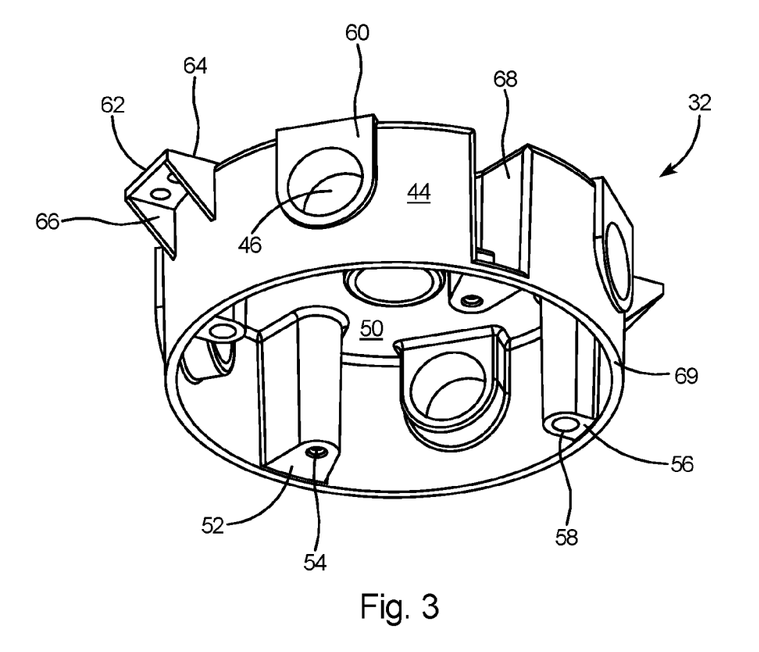
FIG. 3 is an isometric view of the electrical box portion of the rain tight fan box of FIG. 2.

As shown in FIG. 3, electrical box 32 includes a top wall 50, a set of box mounting bosses 52 including bores 54 formed in the sidewall 44 and a set of fan mounting bosses 56 with bores 58 therein. A reinforced hub 60 is provided around each of the conduit ports 46. Hanger mounting tabs 62 extend from the sidewalls 44 on opposing sides, preferably 180° apart, of the electrical box 32. The hanger mounting tabs 62 include two sides 64 and a support leg 66 extending from each tab side 64 and anchoring the tabs to the sidewalls. A recessed area 68 is provided in the electrical box sidewall 44 at each box mounting boss 52. Electrical box 32 sidewall 44 includes a planar lower edge 69.

Figure 4:
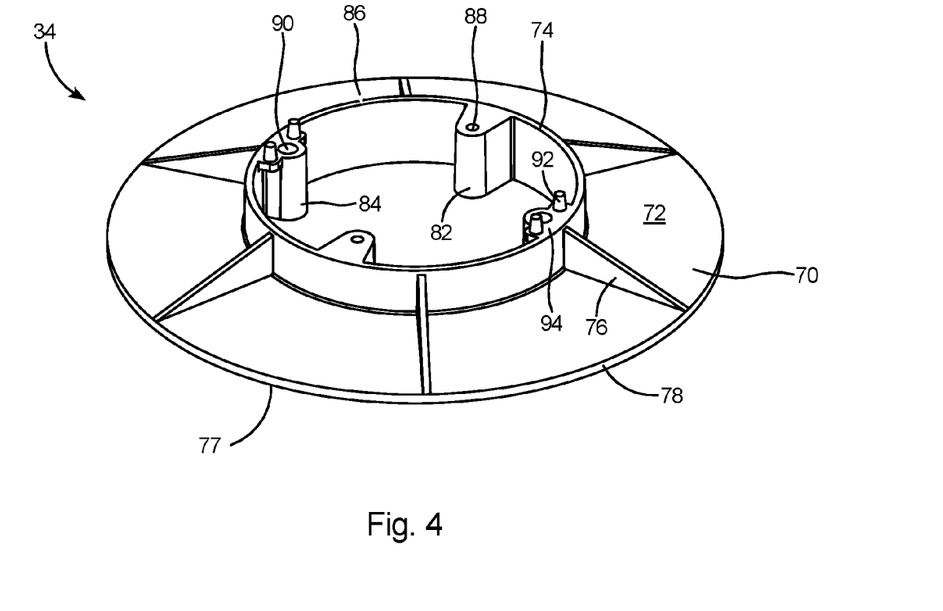
FIG. 4 is an isometric view of a medallion that forms a portion of the rain tight fan box of FIG. 2.

With reference to FIG. 4, medallion 34 includes a flange 70 having a top surface 72, a peripheral wall 74 extending from the top surface, and one or more triangular-shaped fins 76 integral with the outer surface of the peripheral wall 74 and the top surface 72 of the flange 70. Flange 70 extends to an outer periphery 78 and includes a downward-extending drip edge 77 (see FIG. 7) on the outer periphery 70 of the flange. First bosses 82 and second bosses 84 extend from the inner periphery 80 of peripheral wall 74. Peripheral wall 74 includes a planar top edge 86. First bosses 82 include a first bore 88 therein and second bosses 84 include a second bore 90 therein. Alignment posts 92 extend from the top surface 94 of the second bosses 84, each alignment post on opposing sides of the second bore 90.

Figure 10:
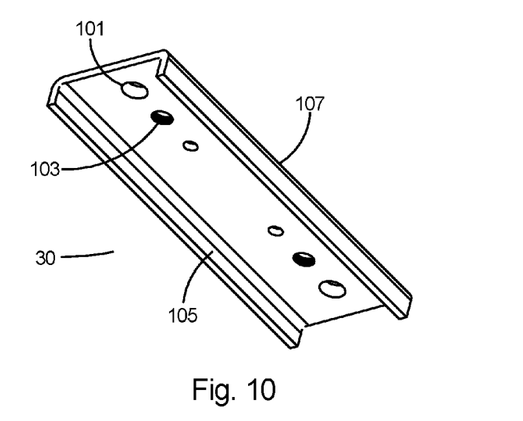
FIG. 10 is an isometric view of a mounting bracket which forms a portion of the rain tight fan box and hanger assembly of FIG. 1.
Figure 11:
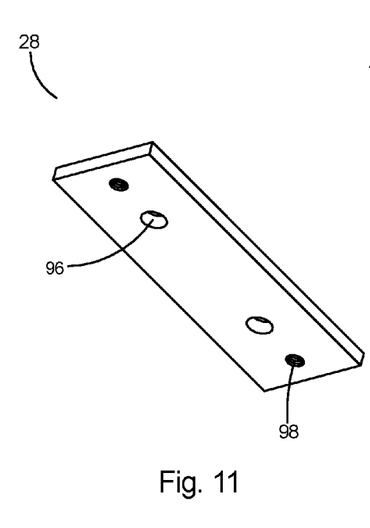
FIG. 11 is an isometric view of a mounting plate which forms a portion of the rain tight fan box and hanger assembly of FIG. 1.
Figure 12:
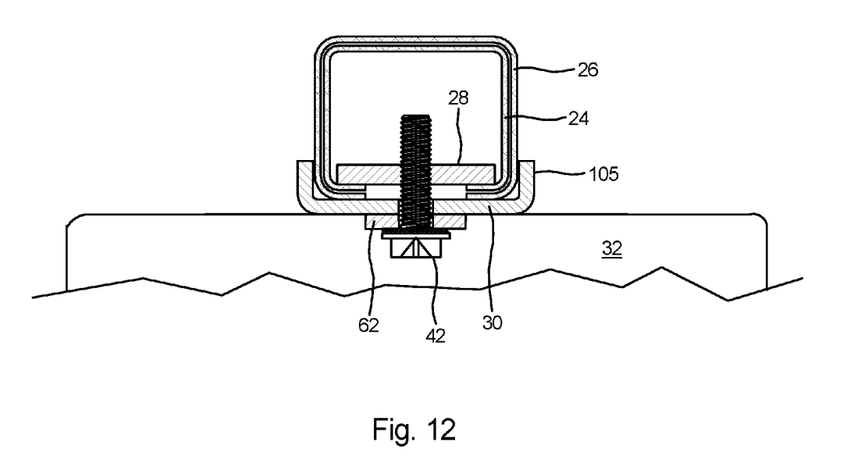
FIG. 12 is sectional view of the rain tight fan box and hanger assembly taken along line 12-12 of FIG. 5.

Referring to FIGS. 10 and 11, mounting plate 28 is preferably a flat member with inner apertures 96 and outer apertures 98, which outer apertures 98 are preferably threaded. Box mounting bracket 30 includes outer apertures 101 and inner threaded apertures 103. Rails 105 extend along the elongated sides 107 of box mounting bracket 30.

Figure 5:
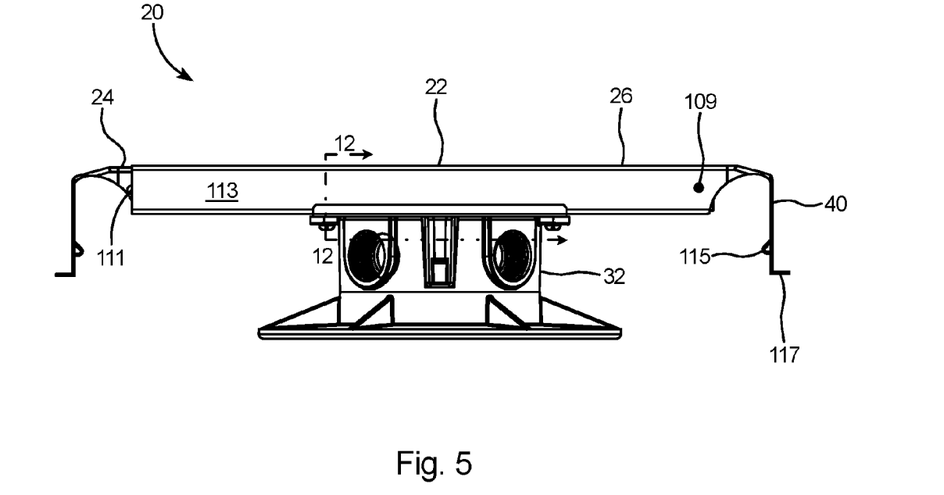
FIG. 5 is a side view of the hanger and fan box assembly.

As shown in FIG. 5, the an inner and outer bars 24 and 26 of the hanger and fan box assembly 20 may include one or more captive fasteners 109 stored in a bore 111 in the sidewall 113 of the bar members. After the adjustable hanger assembly 22 is adjusted to fit between adjacent rafters (not shown), the captive fastener 109 is removed from the sidewall bore 111 and may be driven through end plate 40 to secure the adjustable hanger assembly 22 to the rafters. A nailing flange 115, which is a portion of the end plate 40 that is lanced from the end plate and bent inwards of the end plate, may be hammered into the respective rafter to temporarily hold the adjustable hanger assembly 22 to the rafters. A joist positioning tab 117, provided on the lower end of the end plate 40, provides a means of rapidly aligning the electrical box 32 with the lower edge of the ceiling wallboard (not shown).

Figure 6:
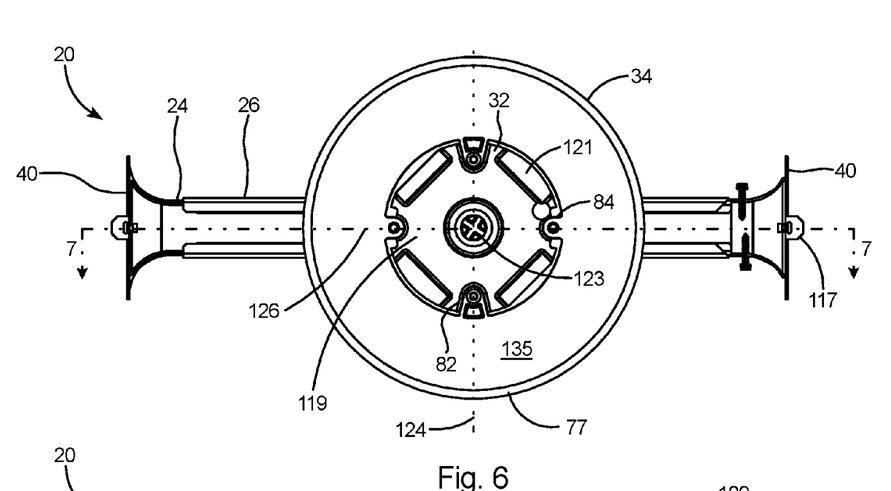
FIG. 6 is a bottom view of the hanger and fan box assembly.
Figure 7:
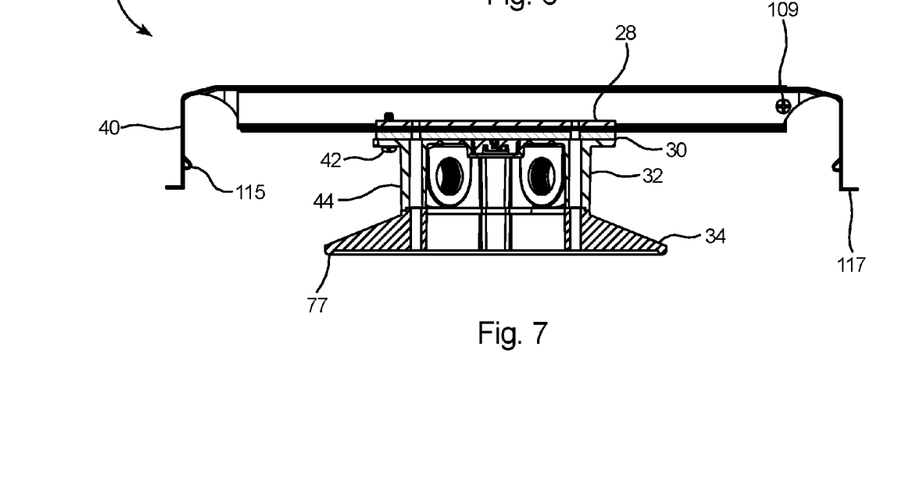
FIG. 7 is a sectional view of the hanger and fan box assembly taken along line 7-7 of FIG. 6.

With reference to FIGS. 6 and 7, the inner cavity 119 of the electrical box 32 includes hub extensions 121 extending inward from each of the reinforced hubs 60 (see FIG. 3) on the electrical box sidewalls 44 into the inner cavity. After wiring is pulled into the electrical box 32 and wiring connections are completed, any hubs 60 that are unused for wiring may be closed off with a plug 123 as shown in FIG. 6.

Figure 8:
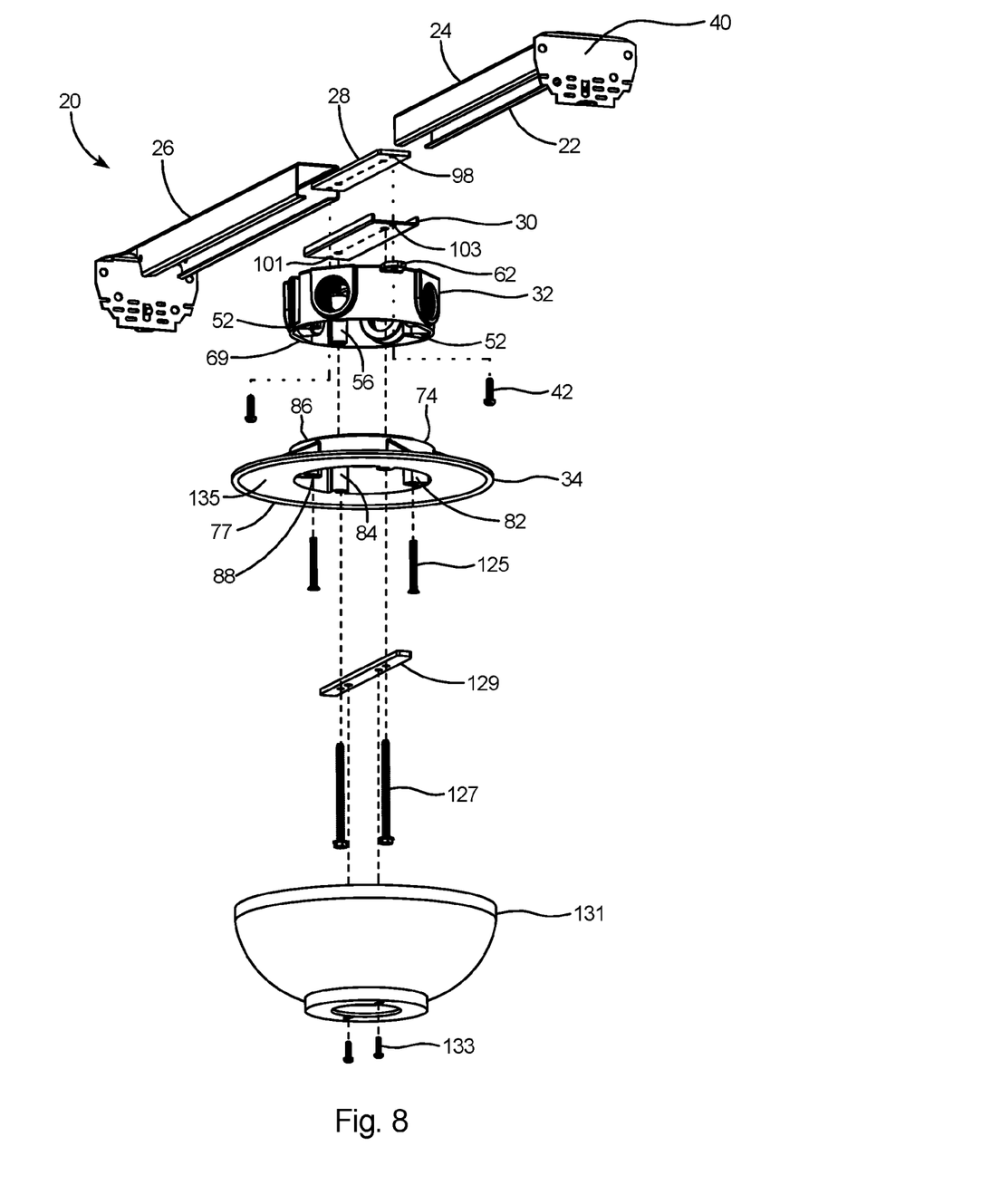
FIG. 8 is an exploded isometric view of the hanger and fan box assembly in alignment with a fan fixture bracket and fan canopy.

Referring to FIG. 8, the hanger and fan box assembly 20 initially includes electrical box 32 loosely assembled to the joined hanger bars 24 and 26 by box fasteners 42 passed through tabs 62 of electrical box 32, though outer apertures 96 in mounting bracket 30 and into threaded bores 98 in mounting plate 28. After being positioned in the desired location along the hanger bar assembly 22, the box fasteners 42 may be tightened to secure the electrical box 32 to the hanger bar assembly. Medallion 34 may then be secured to the electrical box 32 with medallion screws 125. Planar lower edge 69 of electrical box 32 sidewall 44 and planar top edge 86 of peripheral wall 74 of medallion 34 meet in a common plane and thus tightening of medallion screws 125 into electrical box 32 results in a moisture-proof and rain-tight seal between the electrical box and medallion 34. Preferably there are two first bosses 82 aligned upon a first axis 124 and two second bosses 84 that are aligned upon a second axis 126. Thus first bosses 82 are aligned laterally or at a right angle with respect to the longitudinal axis 126 through the hanger bars 24 and 26 of the hanger assembly 22 and second bosses 84 are aligned along the longitudinal axis 126. Thus the paired first bosses 82 are aligned at a 90° angle from the pair of second bosses 84. Rain-tight electrical box 32 and medallion 34 are configured such that first bosses 82 of medallion each align coaxially with a corresponding medallion mounting boss 52 of electrical box 32 and second bosses 84 of medallion each align coaxially with a corresponding fan mounting boss 56 of electrical box 32.

Wiring connections can then be completed between the electrical box and the wiring (not shown) of the fan or fixture. Elongated fan mounting screws 127 may then be driven through the fan or fixture bracket 129, which is typically supplied by the manufacturer with the fan or fixture, through the axially aligned bores in the second bosses 84 of medallion 34 and the fan mounting bosses 56 electrical box, and tightened into the threaded apertures 103 in the mounting plate 30. The inner bar 24, outer bar 26, mounting plate 28, and mounting bracket 30 are all preferably constructed of steel, thus the fan or fixture bracket 129 and any fan or fixture connected to it will be securely supported by steel components. Fan canopy 131 can then be secured to the hanger and fan box assembly 20 by fixture screws 133. Lower surface 135 of medallion 34 overlaps and seals against the upper edge of the fan canopy 131 and thus provides a moisture and rain-tight hanger and fan box assembly 20 that can be safely used with wet-rated or damp-rated fans or fixtures.

Figure 9:
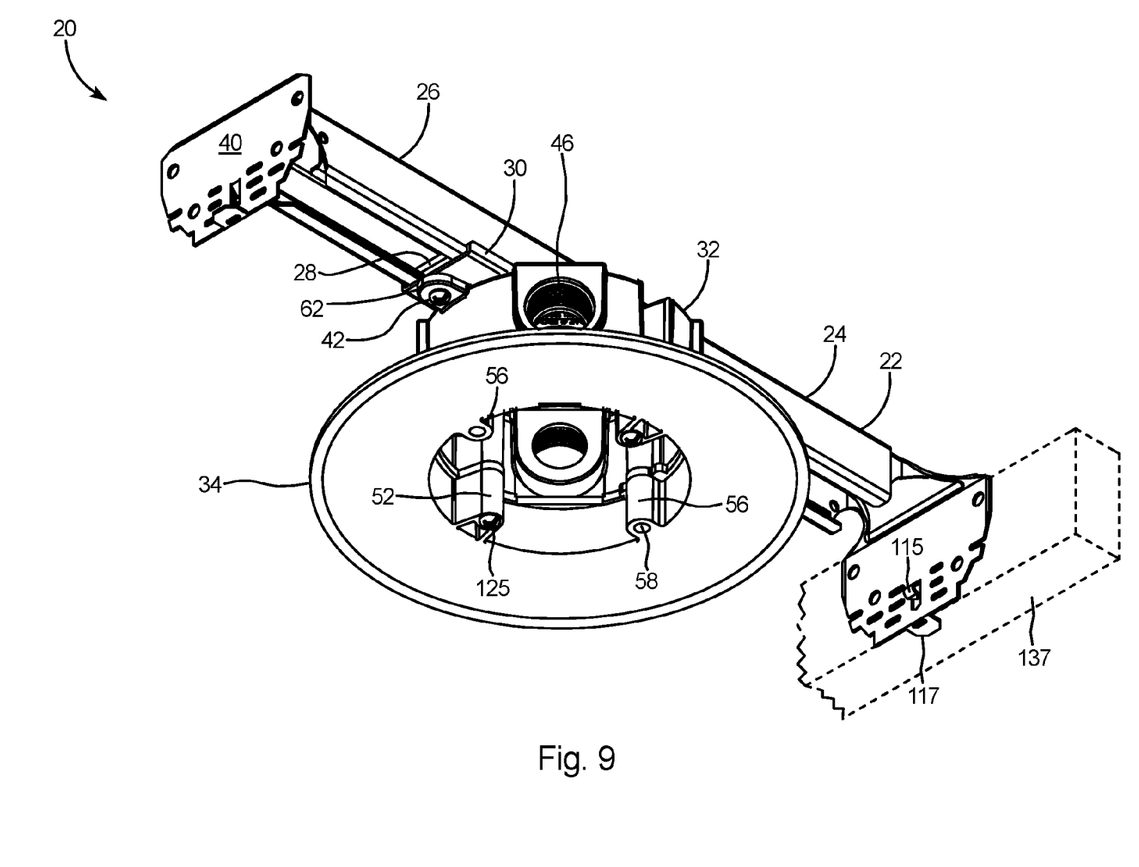
FIG. 9 is an isometric view of the hanger and fan box assembly with the medallion and fan box assembled to the hanger bar assembly.

FIG. 9 depicts the hanger and fan box assembly 20 of the present invention with the electrical box secured to the hanger assembly 22 by box fasteners 42 and medallion 34 secured to electrical box and hanger assembly by medallion screws 125. Thus assembled between two joists or similar overhead supports 137 (one of which is shown), the hanger and fan box assembly 20 is ready for attachment of an electrical fan or fixture.

With reference to FIG. 8, when mounted to the hanger and fan box assembly 20, fan or fixture, the canopy portion 131 of which is shown in FIG. 8, and the internal wiring connections will be maintained moisture-proof and rain-tight with all falling rain channeled off of the electrical box 32 and off of the flange 70 of the medallion 34 to safely fall off of drip edge 77.

Although the electrical box and medallion can be constructed of metal or plastic, most preferably, the front electrical box 22 and medallion 26 are each molded in one-piece of plastic, such as polycarbonate or polyvinyl chloride. Hanger bars 24 and 26, mounting plate 28, and mounting bracket 30 are preferably constructed of galvanized steel.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A hanger and fan box assembly, comprising:
    an adjustable hanger assembly including an inner bar member slideably engaged within an outer bar member and an inner channel, a substantially flat mounting plate slideably disposed within said inner channel;
    an electrical box assembly including an electrical box having a sidewall and a top wall defining an electrical enclosure with an open end, and a medallion for connection to the open end of said electrical box;
    a mounting bracket for securing said electrical box to said adjustable hanger assembly;
    a peripheral wall on said medallion;
    said peripheral wall of said medallion including an inner periphery and outer periphery;
    a flange extending from said outer periphery of said peripheral wall of said medallion; and
    a drip edge on said flange;
    a top surface on said flange of said medallion;
    one or more fins extending radially from said peripheral wall of said medallion; and
    said fins integral with the outer surface of said peripheral wall and said top surface of said flange.

2. The hanger and fan box assembly of claim 1, further comprising:
    a planar lower edge on said electrical box; and
    a planar top edge on said medallion, wherein said planar edges enable a flush and rain-tight engagement of said medallion to said electrical box.

3. The hanger and fan box assembly of claim 1, further comprising:
    tabs extending outward from said sidewall of said electrical box; and
    fasteners for securing said electrical box assembly to said adjustable hanger assembly and for securing said medallion to said electrical box.

4. The hanger and fan box assembly of claim 3, further comprising an aperture in said tab of said electrical box.

5. The hanger and fan box assembly of claim 4, further comprising:
    sides on said tabs; and
    a support leg extending between said sides of said tab and said sidewall of said electrical box.

6. The hanger and fan box assembly of claim 5, further comprising:
    an opening in said sidewall of said electrical box;
    an inner surface on said sidewall of said electrical box;
    a peripheral wall extending from said inner surface of said electrical box around said opening; and
    a plug for closing said opening in said electrical box.

7. The hanger and fan box assembly of claim 6, further comprising:
    an outer surface on said sidewall of said electrical box; and
    a flat raised surface extending from said outer surface of said electrical box around said opening.

8. The hanger and fan box assembly of claim 1, further comprising:
    side walls on said bar members;
    a threaded bore in each of said side walls of said bar members; and
    bar fasteners held captive within said threaded bore in said side walls of said bar members.

9. The hanger and fan box assembly of claim 8, further comprising:
    end plates on said bar members, said end plates having an aperture therein; and
    said bar fasteners removable from said side walls and insertable through said aperture in said end plate for securing said adjustable hanger assembly to a joist.

10. The hanger and fan box assembly of claim 1, further comprising:
    sides on said mounting bracket;
    rails extending along said sides of said mounting bracket; and
    a bar fastener for securing said electrical box to said mounting bracket.

11. A hanger and fan box assembly comprising:
    an adjustable hanger assembly including an inner bar member slideably engaged within an outer bar member and an inner channel, a substantially flat mounting plate slideably disposed within said inner channel;
    an electrical box assembly including an electrical box having a sidewall and a top wall defining an electrical enclosure with an open end, and a medallion for connection to the open end of said electrical box;
    a mounting bracket for securing said electrical box to said adjustable hanger assembly;
    one or more fan mounting bosses on said electrical box, said fan mounting bosses of said electrical box including bores therein;
    one or more second bosses on said medallion, said second bosses of said medallion including bores therein;
    said bores of said second bosses of said medallion are configured for coaxial alignment with said bores of said fan mounting bosses on said electrical box; and
    a recessed sidewall portion at each of said first bosses on said electrical box.

12. A hanger and fan box assembly comprising:
    an adjustable hanger assembly including an inner bar member slideably engaged within an outer bar member and an inner channel, a substantially flat mounting plate slideably disposed within said inner channel;
    an electrical box assembly including an electrical box having a sidewall and a top wall defining an electrical enclosure with an open end, and a medallion for connection to the open end of said electrical box;
    a mounting bracket for securing said electrical box to said adjustable hanger assembly;
    one or more medallion mounting bosses on said electrical box;
    one or more first bosses on said medallion, wherein said first bosses of said medallion are configured for coaxial alignment with said medallion mounting bosses on said electrical box;
    a shoulder on said second boss of said medallion; and
    an alignment post extending from said shoulder.

* * * * *